United States Patent
Melbø et al.

(10) Patent No.: US 6,944,563 B2
(45) Date of Patent: Sep. 13, 2005

(54) ON-LINE COMPOSITIONAL ALLOCATION

(75) Inventors: Hallgeir Melbø, Oslo (NO); Robert Anton Bernard van der Geest, Oslo (NO); Svein Arne Morud, Bekkestua (NO); Bjørn Øyvind Bringedal, Oslo (NO)

(73) Assignee: ABB Research Ltd., Billingstad (NO)

( * ) Notice: Subject to any disclaimer, the term of this patent is extended or adjusted under 35 U.S.C. 154(b) by 17 days.

(21) Appl. No.: 10/434,468

(22) Filed: May 9, 2003

(65) Prior Publication Data

US 2004/0225464 A1 Nov. 11, 2004

(51) Int. Cl.[7] .................................................. G01F 1/12
(52) U.S. Cl. ............................ 702/100; 702/50; 702/55
(58) Field of Search .................................. 702/117, 119, 702/196, 23, 30, 50, 55, 100; 73/61.44, 61.46, 861.04; 340/606, 632

(56) References Cited

U.S. PATENT DOCUMENTS

| | | | | | |
|---|---|---|---|---|---|
| 4,513,154 A | * | 4/1985 | Kurtz | ........................ | 570/145 |
| 5,060,507 A | * | 10/1991 | Urmson et al. | ............ | 73/24.01 |
| 6,335,959 B1 | * | 1/2002 | Lynch et al. | ................... | 378/45 |

* cited by examiner

*Primary Examiner*—Bryan Bui
(74) *Attorney, Agent, or Firm*—Dykema Gossett PLLC

(57) ABSTRACT

A method and a system to provide allocation of mixed flow to individual sources in oil and gas production systems by measuring mixed flow; analyzing the composition; accessing the data for the mixed flows; and calculating the flow from each source with an allocation algorithm using the mixed flow, the analyzed composition and the composition of at least one source.

28 Claims, 2 Drawing Sheets

ON-LINE COMPOSITIONAL ALLOCATION

TECHNICAL FIELD

The invention relates to oil and/or gas production systems. In particular the invention relates to the identification of how much each source, such as an individual well or production zone, contributes to the total flow from the sources.

BACKGROUND ART

A source in an oil and/or gas production system may for instance be a well, a production zone, a reservoir zone or a reservoir. The flow from each source is typically a multiphase flow comprising a composition of oil and gas related components, brines, metals, water, etc. The flow may be defined as mass rate or volume rate. Typically, the pipelines from a plurality of sources are by some means connected to a single pipeline. In the case of offshore oil and gas production this may be a riser, which brings the total flow to a production facility above sea level. An example of such a production facility is a production platform, a production ship or an on-shore production facility. This means that flows from different sources have been blended as they go into the production facility. Hence, the allocation of flow rates to each source is a major challenge.

Prior art shows that direct measurements of flow rates in multiphase flows are possible by using multiphase flow meters. As already mentioned, the flows from several sources are often blended in a single riser, so to measure the rates from each source directly, one would as an example need a multiphase flow meter associated with each of them.

There exists prior art in the field of analysis of oil and gas composition for a multiphase fluid. U.S. Pat. No. 5,166,747 describes an apparatus for analyzing composition of formation fluids in a borehole. The apparatus distinguishes between formation fluids and mud filtrate. The apparatus use absorption spectral information to determine the composition of the fluid.

EP 859236 shows a method for controlling a process for separating at least one component from crude oil, which flows into a pipeline and then through a separator. The method comprises the step of analyzing a sample of crude oil before it enters the pipeline to give an analytical result before the crude oil, from which the sample was taken, reaches the separator.

WO 9414060 describes a composition analyzer for determining the composition and flow rate of a multi component, multiphase fluid containing a gas. The analyzer comprises a conduit for receiving the flow of the multi component and multiphase fluid. A section of the conduit is heated. The analyzer comprises means for measuring the temperature, pressure and flow rate of the fluid at points closely adjacent to, and upstream and down stream from the heated section of the conduit. Measurements are sent to a programmable logic computer, the computer being programmed to use thermodynamic and gas law relationships to calculate the fluid composition and the flow rates of the fluid compositions.

One approach to allocate flow rates to sources is to apply computer simulations to determine the flow rates that give the best possible fit to measured flow properties such as pressure and temperature. Such measurements may be available for each source or the pipeline transporting fluid from the source. A remaining problem is that the success of such an approach depends on the existence of the previously mentioned measurements and further it depends on whether models and computer simulations are reliable. A problem is that the mentioned measurements are, due to cost reasons, often not available. Another problem is that, if such measurement equipment does exist but fails it is expensive to repair since it may be situated sub-sea and even down-hole. Even if such equipment is repaired or substituted, a remaining problem is to estimate or calculate flow from the sources during times when measurements are unavailable.

It is known that fluids produced from different sources typically have slightly different compositions. A mixture of a certain oil, gas, and water is an example of a fluid. The fluids originating from different production sources consist mostly of the same components, but usually the concentrations vary slightly from one source to the other. The paper "Characterizing the Greater Burgan Field: Use of Geochemistry and Oil Fingerprinting"; SPE 37803, published by Society of Petroleum Engineers, Inc. 1997, describes that oil fingerprints are identified for producing reservoirs and are used to identify wells with mixed production because of wellbore mechanical problems.

Another problem is that there is an increased demand for improved reliability and robustness of flow allocation performed in existing installations where on-line measurements of flows from individual sources are available. For instance, there is a need to continue to perform flow allocation, when such on-line measurements are unavailable due to equipment or communication failure.

SUMMARY OF THE INVENTION

The above mentioned problems as well as other problems are solved by the invention described below.

An aim of the invention is to provide a method to allocate a flow back to a plurality of sources in an oil and/or gas production system, which method is independent of on-line measurements taken at the sources or close to the sources.

An object of the invention is to provide a method in which the mixed flow of at least one phase is measured on-line in or after a pipeline, in which pipeline the mixed flow of the at least one phase is transported. Further the method comprises that the composition of traceable fluid components of the at least one phase of the mixed flow is analyzed on-line by an analyzing device, which analyzing device may be any device that implicitly or explicitly determines the concentration of fluid components. The method also comprises that the measured mixed flow rate and the analyzed composition are made available to a computing device. The computing device calculates the flow from each source by means of an allocation algorithm. The allocation algorithm utilize the measured mixed flow and the analyzed composition. Further the method comprises that the allocation algorithm utilize a composition of the at least one phase associated with each of the involved sources. In the method the composition of the at least one phase of each source is established before the on-line measurement, on-line analysis and on-line calculation are performed. The composition of the at least one phase associated with each of the involved sources may be established by use of prior art techniques based for instance on single well tests.

With on-line is meant that measurements, appropriate analysis and calculations are performed during normal production at a production system, and further that measurements as well as fluid samples for analysis are taken on-line from the mixed flow. A fluid sample used in the on-line analysis is taken at any point in the production system where the flows from all the involved sources are in one mixture, for instance at the end of a riser. The at least one phase may be a gas phase, an oil phase, or an aqueous phase or any combination of said phases.

An important and particularly useful feature of the invention is that it enables on-line allocation of flows back to sources where it is sufficient with only one on-line analysis of the composition of at least one phase of the mixed flow and only one flow measurement.

An important advantage of the invention is that it provides allocation of flow without having installed equipment for measuring flow parameters, such as flow rate, temperature or pressure, at or close to the sources. In this manner the invention reduces the cost for an oil production system. Such equipment may be installed despite the cost, but in such a case the invention provides that allocation of flows is made even if communication to such equipment is unavailable or communication to the topside fails.

Another advantage of the invention is that a method for on-line allocation based on it uses measurements from equipment that is less costly to maintain and repair compared to equipment needed for prior art methods. The invention is particularly useful at an offshore oil and/or gas production system since the invention enables that all on-line measurements for the purpose of allocation of flow are made above sea level or close to sea level. That means that compared to prior art techniques for allocation, which depend on that sub sea, wellhead or down hole equipment provides measurements, the invention discloses that the equipment necessary for on-line measurements may be installed topside, which in turns provides for less costly maintenance and faster repairs.

Another advantage of the invention is that in the case that no measurement of the mixed flow rate is available, and the only available measurement is the on-line analysis of the composition of the at least one phase of the mixed flow, the invention still enables the allocation of relative flows back to the sources.

Another object of the invention is to provide a system to allocate a flow back to a plurality of sources in an oil and/or gas production system. The system comprises a measuring device, which repeatedly measures the mixed flow rate of the at least one phase, the measurement being made in or after the pipeline. The system further comprises an analyzing device, which repeatedly analyzes the composition of the at least one phase of the mixed flow. The analyzing device is fed with fluid samples from the mixed flow. The system further comprises a computing device in which the flow from each source is repeatedly calculated by means of the said allocation algorithm.

Another object of the invention is to provide a computer program comprising program code means loadable into a CPU of a computing device. The computer program is capable of performing any of the steps of the previous described method.

Another object of the invention is to provide a computer program product stored on a computer readable media comprising program code means loadable into a CPU of the mentioned computing device. The computer program product is capable of performing any of the steps according to the previous described method.

BRIEF DESCRIPTION OF THE DRAWINGS

The present invention will be described in more detail in connection with the enclosed schematic drawings.

DETAILED DESCRIPTION OF THE INVENTION

Figure 1:
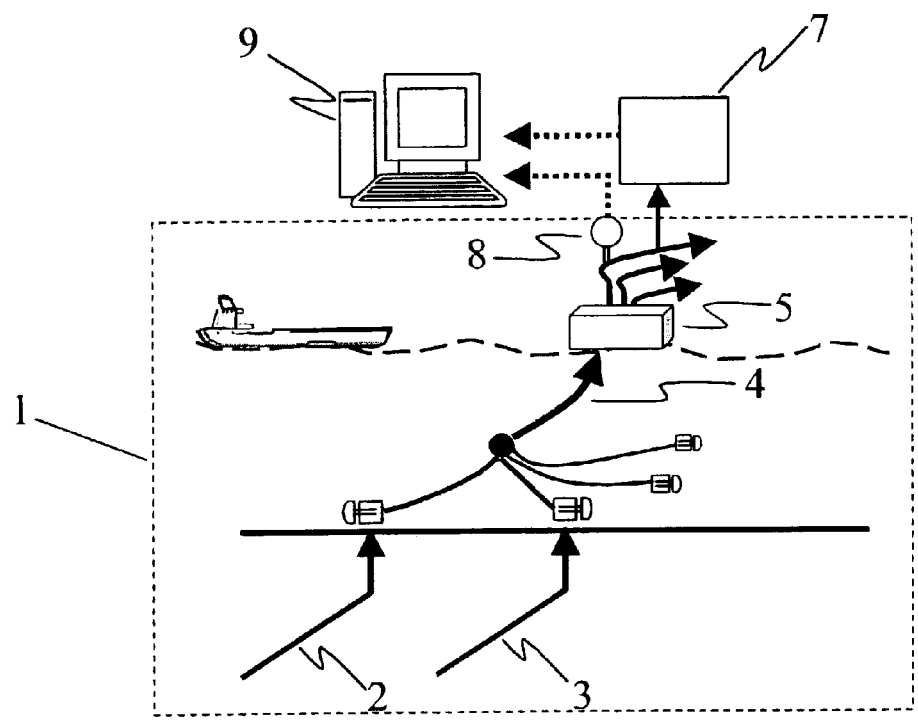
FIG. 1 shows an overview of an oil and/or gas production system. The oil and/or gas production system in the example is an offshore production system.

FIG. 1 shows an overview of an oil and/or gas production system 1. The figure shows the case of an offshore oil and/or gas production system. An oil and/or gas production system comprises a plurality of sources. FIG. 1 shows a production system comprising a flow, such as a multiphase flow, from a plurality of sources indicated as 2 and 3. The total flow from the sources flows are mixed in transportation means such as a pipeline 4. One type of pipeline, in the case of an offshore production system, is a riser. The sources 2 and 3 may for instance be wells, production zones, reservoir zones or reservoirs. The invention relates to how to perform on-line allocation of a flow back to a plurality of sources in the oil and/or gas production system. An offshore production system may comprise a topside separator 5. The position of a flow measurement device 8 and an on-line analyzer 7 is symbolic and not limited to a position after the separator 5 or to a specific outlet of the separator.

Figure 2:
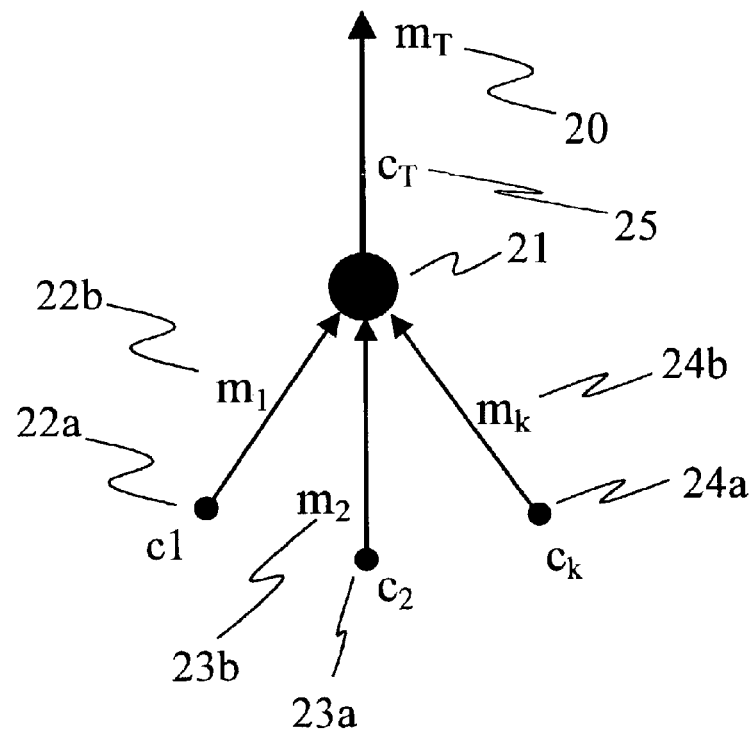
FIG. 2 shows a principal overview of a plurality of multiphase flows blended into one flow.

FIG. 2 shows a schematic overview of sources, flows and compositions of a production system. The mixed flow $m_T$ 20 is a mix of the flow $m_1, \ldots, m_k$ 22b–24b from each source 22a–24a. The mixed flow is the flow of at least one phase from each of the sources. Hence, the mixed flow may be a subset of the total flow in the pipeline 4. The sources may be the sources 2 and 3 shown in FIG. 1. The flow from each source is by means of the invention allocated for instance as a mass flow or a volume flow. The invention enables on-line allocation by use of a suitable device for establishing the composition $c_T$ of the mixed flow 20. The allocation is based on measurement at any point in the production system where the flows from all the involved sources are in one mixture. Such a point for measurement may for instance be at the end of a riser, in a separator or at an outlet of the separator. Such an on-line analyzer is symbolized as 7 in FIG. 1. Any device or measurement method that explicitly or implicitly determines the composition of traceable fluid components can be used. The concentration of traceable components of the fluid is analyzed, such as the hydrocarbon composition of the oil phase or the salt concentrations in the aqueous phase or any combination of phases. Once again, in this context the fluid may comprise one or several phases. If one or a set of phases of a fluid is considered, then this may be defined as another fluid. The analyzing device may be a gas chromatograph, a device using near infrared technology, a mass spectrometer or a device using UV-fluorescence.

In an oil and/or gas production system each source 22a–24a typically has its own distinct signature in terms of concentrations. Each source then gives a contribution to the mixed flow that cannot be associated with any of the other sources. A method based on the invention for on-line allocation utilizes this signature together with the below described algorithms. It is possible to influence these signatures or concentrations for instance by injecting fluids, such as methanol or lift gas, at points where the flows are not yet blended. This makes it easier to distinguish composition of flows between the sources.

A method based on the invention comprises that at least parts of the composition of the fluid originating from each source is established and associated to each source 22a–24a. With composition is typically meant hydrocarbon composition and/or composition of inorganic components. Examples of measurements and analytical techniques to establish composition for a single source have been discussed in the prior art section. Establishing the composition may comprise the use of measurement equipment being temporarily or permanently located at a borehole, a wellhead or down hole. Establishing the composition of a fluid from a source may also comprise that a set of test samples are taken from the source. Another possibility is to deduce the composition directly from the composition of the mixed flow, which can be done if the rate from each involved well is known at some points in time and the composition of the mixed flow is measured at the same points in time. Yet another possibility is to tune the composition using other measured properties of the fluid and a fluid model. Any of the above mentioned, or other, prior art techniques may be used in order to establish the composition of at least one phase of the flow from each involved source. As a result each source gets its own composition vector $c_1, \ldots, c_k$, which comprise the relative amount of each component associated with that source. Again note that a fluid may consist of any selection of phases from the phases that comprise the flow. A phase may for instance be the oil phase, the gas phase, or the aqueous phase of the flow. The composition vectors are typically linearly independent. It is beneficial to assume that the composition vectors are constant for a given period of time.

Figure 3:
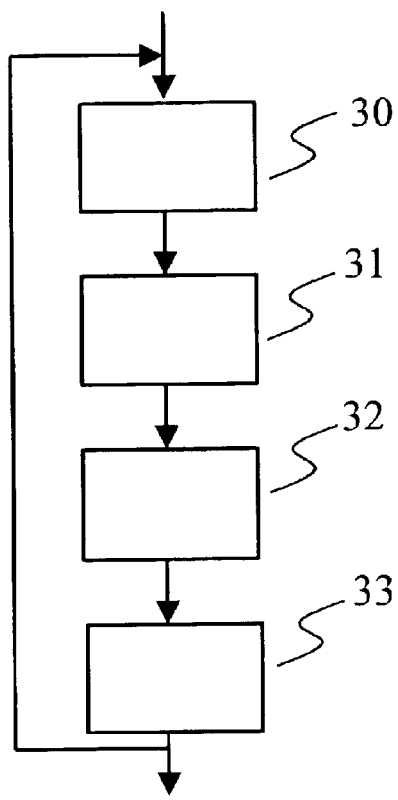
FIG. 3 shows an overview of a method according to the invention.

FIG. 3 shows an overview of a method according to the invention.

The method comprises measuring 30 repeatedly the mixed flow rate of at least one phase. Repeatedly means that the measuring step, and other steps, of the method are made repeatedly typically with a regular interval. An example of such a suitable interval is 1 hour. With repeatedly is meant that the other steps of the method are performed before the measuring step is repeated. This should not be confused with that in an alternative embodiment the flow measurements of the mixed flow might be performed continuously during the measuring step. The mixed flow rate $m_T$ 20 of at least one phase, for instance the aqueous phase, the oil phase, the gas phase or a combination of phases is measured on-line. In other words, with mixed flow is meant the sum of the flow rates from each of the involved sources 22a–24a, $source_1, \ldots, source_k$. If flow rate measurements are not available, a method based on the invention is not able to allocate flow rates in absolute numbers but is still able to allocate relative flow rates to the sources. In the case of an embodiment at an offshore production system one may measure the mixed flow rate in the riser. An alternative embodiment at an offshore production system may comprise that the mixed flow corresponds to a gas phase and is measured at an outlet after a topside separator 5.

The method according to the invention further comprises that the composition $c_T$ 25 of the mixed flow rate 20 of at least one phase is repeatedly analyzed on-line 31. A fluid sample is taken at any point in the production system where the flows from all the involved sources are in one mixture, for instance at the end of a riser. The at least one phase analyzed on-line corresponds to the at least one phase previously associated with each of the involved sources 22a–24a. Further, it is the same at least one phase that is analyzed, as is measured as the mixed flow in the measuring step. The analysis may be performed a number of times each time the analyzing step is performed. As with the measuring step, the analyzing step is performed repeatedly. The composition typically comprises a hydrocarbon and/or an inorganic composition. The components in the analyzing step may be a subset of the components of the at least one phase, such as the heaviest components in the oil phase or the lightest components in the gas phase. It is beneficial to use equipment proven in composition analysis, such as the previous described analyzing device 7. The on-line analysis, and the previous mentioned (offline) analysis of establishing the composition associated with each source, may very well be performed by using the same analyzing device.

The method according to the invention further comprise that the measured flow and the analyzed composition are accessed 32 and made available to a computing device 9. Examples of such a computing device is a workstation, a Personal Computer (PC), a Programmable Logic Controller (PLC), a handheld computer, an Industrial Control System, an analyzer, a measurement device or a purpose built device. In order to perform calculations in an efficient way, the calculations and algorithms may be executed in any number of devices. It is preferred that the measurements and/or results of the analysis are automatically sent to such a device or devices by some means of communication, for instance by means of a fieldbus.

The method according to the invention further comprise that the computing device calculates the flow from each source by means of an allocation algorithm in a calculating step 33. As with the measuring step and the analyzing step, the calculating step is performed repeatedly. The calculation algorithm is outlined below. In the following there will be made no distinction between considering the mixed flow of one or more of its phases or the mixed flow of all phases.

As mentioned FIG. 2 shows an overview of involved vectors used in the calculation step in a method based on the invention. FIG. 2 shows the compositions $$c_1, \ldots, c_k, \text{ and } c_T.$$

previously indicated $c_1, \ldots, c_k$ are typically established off-line. $c_1, \ldots, c_k$ are compositions associated with each of the individual sources; $source_1, \ldots, source_k$. $c_T$, is the composition or concentration vector for the mixed flow. The composition is in an embodiment of the invention analyzed repeatedly during on-line production. The above and the following description of composition measurement are symbolic and should be seen as an example and should not limit the scope of the invention. It may for instance be so that one or a set of the components is measured and relations of others are calculated from such measurements.

The flow rate may for instance be measured and symbolized as mass rate or volume rate. The mixed flow rate 20 in one or more of its phases, $m_T$, is as previously mentioned assumed to be measured, whereas the corresponding flow rates of the mentioned one or more phases from each source 22b–24b, $m_1, \ldots, m_k$, are the unknown flow rates to be calculated by means of the allocation algorithm. If the mixed flow rate of all the phases is not measured, and instead the flow rate for one or a set of phases is measured, then the flow rate for the one or the set of phases corresponding to each individual source is calculated in the calculating step. Below is a schematic overview of matrices used in a calculating step 33, which allocates flow to multiple sources 22a–24a. The composition matrix C is the matrix in which the composition vectors $c_1, \ldots, c_k$ are the columns, $$C=[c_1, \ldots, c_k].$$

Let m define the vector of flow rates from the individual sources, $$m=[m_1, \ldots, m_k]^T.$$

The superscript T indicates the transpose of the vector. Due to mass conservation the flow rates and the compositions satisfy the following matrix equation, $$Cm = m_T c_T.$$

Define w to be the vector consisting of the relative flow rates from each source, $$w = [w_1, \ldots, w_k]^T \text{ in which } w_i = m_i/m_T \; i=1, \ldots, k.$$

The matrix equation for the conservation of mass of each component then reads $$Cw = c_T.$$

Before solving this system of equations it is advantageous to remove equations that do not provide relevant information about the true source of the flow rates or by other means preprocess the system of equations. The aim of such preprocessing is to minimize the effect of measurement errors. The preprocessing may for instance involve statistical and mathematical methods, decisions based on experience, or decisions based on the performance of the device providing the measurements. Examples of suitable statistical and mathematical methods are multivariate analysis (MVA) and linear analysis. The final set of equations can be solved in various ways. In one embodiment the method of least squares is used.

Provided the matrix C is not singular, which is satisfied if its columns are linearly independent, the unknown vector w is calculated. When the vector w is determined, the mass fraction or volume fraction (whichever is relevant) originating from each of the sources is known, and if the mixed flow rate 20, $m_T$, is measured, the individual flow rates $[m_1, \ldots, m_k]$ are calculated directly from the definition of $w_i$.

The implementation of the algorithm may be made in a computer programming language such as C++ or similar. In the case that at least part of the algorithm is to be executed in a PLC or in an industrial controller, a suitable language for implementation is a language derived from the IEC 6-1131 standard, or a language which is at least partly compatible with the IEC 6-1131 standard.

The result of the calculation, that is the flow rates allocated back to each source, is temporarily stored in the memory of the computing device 9. The result of the calculation may be presented on a computer screen to users such as process operators or process engineers. The flow rates allocated back to each source are typically stored on a computer readable media. Such a computer readable media may be a hard disk and is located close to the oil and/or gas production system or remotely for instance on-shore in the case of an offshore production system.

The steps of the above described method may be performed in an order different from the order in which they are described.

Figure 4:
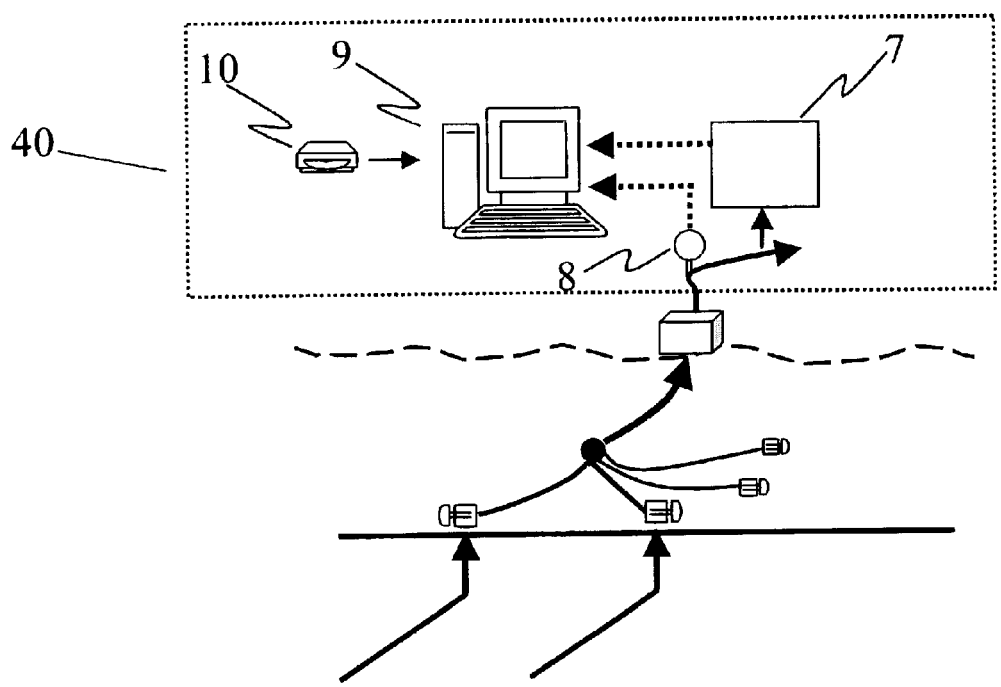
FIG. 4 shows schematically a system according to the invention.

A system 40 based on the invention is shown in FIG. 4. The system comprises the previous mentioned measuring device 8. The measuring device measures the mixed flow rate of at least one phase. The measuring device may be a flow meter. It may also be a multiphase flow meter. The measurement is made in or after the pipeline. The measurement may be taken before, in or after an existing topside separator. The measuring device may be measuring the mixed flow of a single phase such as a gas phase.

The system 40 according to the invention further comprises the previously mentioned analyzing device 7, which analyzes the composition of at least one phase of the mixed flow 4. The analyzing device 7 is fed with fluid samples of the mixed flow. The samples are taken in or after the pipeline transporting the mixed flow. The fluid sample may be taken manually, automatically or may be taken by leading a stream of the mixed flow into the analyzing device.

The system 40 according to the invention further comprises the previously mentioned computing device 9. The computing device repeatedly calculates the flow 22b–24b $m_1, \ldots, m_k$ from each source 22a–24a, by means of the previously mentioned allocation algorithm.

A computer program 10 according to the invention is capable of performing any of the steps according to the previously described method. The computer program is loadable into a CPU of the already mentioned computing device 9.

A computer program product 10 according to the invention is stored on a computer readable media comprising program code means loadable into a CPU of the mentioned computing device 9. The computer program product is capable of performing any of the steps according to the previously described method.

It should be appreciated that the above description of embodiments are merely examples and should not limit the scope of the invention.

What is claimed is:

1. A method to allocate a flow back to a plurality of sources (22a, 23a, 24a) in an oil and/or gas production system (1), in which a composition of at least one phase of each of the sources (22a, 23a, 24a) is known and associated with each source, and the flow from the sources is transported as a mixed flow (20) in one pipeline (4), said method comprising the steps of:

measuring the mixed flow of the at least one phase, said measurement being made in or after a pipeline (4), analyzing the composition (25) of the at least one phase of the mixed flow (20), by means of a device (7) which uses fluid samples from the mixed flow (20), which samples are taken in or after the pipeline (4), accessing data for said measured mixed flow (20) and said analyzed composition and making them available to a computing device (9), calculating in said computing device (9) the flow (22b, 23b, 24b) from each source (22a, 23a, 24a) by means of an allocation algorithm, which allocation algorithm utilizes said measured mixed flow (20), said analyzed composition (25) and said composition of at least one phase associated with each source to allocate the flow (22b, 23b, 24b) back to said plurality of sources (22a, 23a, 24a).

2. A method according to claim 1, wherein said device (7) in the analyzing step uses a technology that explicitly or implicitly determines the concentration of traceable fluid components.

3. A method according to claim 1 or claim 2, wherein the flow from each source is calculated as a mass flow or a volume flow.

4. A method according to claim 3, wherein the composition of the at least one phase are the composition vectors $c_1, \ldots, c_k$ associated with source$_1, \ldots,$ source$_k$, and the composition vector $c_T$ of the mixed flow, are composition vectors of at least one traceable fluid component, and a composition matrix C is the matrix in which the composition vectors $c_1, \ldots, c_k$ are columns, which matrix C is symbolized as $$C = [c_1, \ldots, c_k].$$

5. A method according to claim 4, wherein the measured mixed flow is $m_T$ and the calculated flow of at least one phase from each of $source_1, \ldots, source_k$ is $m_1, \ldots, m_k$ and m define the vector of flow from the individual sources, which vector m is symbolized as $$m=[m_1, \ldots, m_k]^T.$$

6. A method according to claim 5, wherein the flow rates and compositions satisfy the matrix equation, $$Cm=m_T c_T.$$

7. A method according to claim 6, wherein the relative flow rates from each source are gathered in the vector $$w=[w_1, \ldots, w_k]^T \text{ in which } w_i=m_i/m_T \; i=1, \ldots, k \text{ and } C_w=c_T,$$

and where each of the individual flow rates $m_1 \ldots m_k$ is calculated based on the definition of $w_i$.

8. A method according to claim 7, wherein the calculating step solves the above described system of equations.

9. A method according to claim 3, wherein the oil and/or gas production system is an offshore oil and/or gas production system, the pipeline is a riser, the device used in the analyzing step is located topside and the sources are located sub sea.

10. A method according to any previous claim, wherein the device (7) in the analyzing step is any of a gas chromatograph or a device using near infrared technology or a mass spectrometer or a device using UV-fluorescence.

11. A method according to claim 10, wherein in the case that the measuring step results in missing values of the mixed flow, the calculating step calculates the relative flow from each source instead of the absolute flow.

12. A method according to claim 11, wherein the fluid components in the analyzing step are a subset of the fluid components of the at least one phase.

13. A method according to claim 12, wherein one of the traceable fluid components was previously injected into a source.

14. A computer program comprising program code means loadable into a CPU of a computing device (9), wherein the computer program is capable of performing the method according to any of claims 1–13.

15. Use of a computer program according to claim 14 for allocating a flow (22b, 23b, 24b) back to a plurality of sources (23a, 24a, 25a) in an oil and/or gas production system (1).

16. A computer program product stored on a computer readable media (10) comprising program code means loadable into a CPU of a computing device (9), wherein the computer program product is capable of performing the method according to any of claims 1–13.

17. A system (40) to allocate a flow back to a plurality of sources (22a, 23a, 24a) in an oil and/or gas production system (1), in which a composition of at least one phase of each of the sources is known and associated with each source, and the mixed flow (20) from the sources is transported as a mixed flow in one pipeline (4), said system comprising:

a measuring device (8), which measures the mixed flow (20) of the at least one phase, said measurement being made in or after the pipeline (4), an analyzing device (7), which analyzes the composition of the at least one phase, which said device (7) is fed with fluid samples of the mixed flow (20), which samples are taken in or after the pipeline (4), a computing device (9) in which a value for the flow (22b, 23b, 24b) from each source (22a, 23a, 24a) is calculated by means of an allocation algorithm, which allocation algorithm utilizes the said measured mixed flow (20), said analyzed composition (25) and said composition of at least one phase associated with each source to allocate the flow (22b, 23b, 24b) back to said plurality of sources (22a, 23a, 24a).

18. A system according to claim 17, wherein the analyzing device (7) uses any measuring technology that explicitly or implicitly determines the concentration of traceable fluid components.

19. A system according to claim 17 or 18, wherein the flow from each source is calculated as a mass flow or a volume flow.

20. A system according to claim 19, wherein the composition of the at least one phase are the composition vectors $c_1, \ldots, c_k$ associated with $source_1, \ldots, source_k$, as well as the composition vector $c_T$ of the mixed flow, are composition vectors of at least one traceable fluid component, and a composition matrix C is the matrix in which the composition vectors $c_1, \ldots, c_k$ are columns, which matrix C is symbolized as $$C=[c_1, \ldots, c_k].$$

21. A system according to claim 20, wherein the measured mixed flow $m_T$ and the calculated flow of at least one phase from each of $source_1, \ldots, source_k$ is $m_1, \ldots, m_k$, and m define the vector of flow from the individual sources, which vector m is symbolized as $$m=[m_1, \ldots, m_k]^T.$$

22. A system according to claim 21, wherein the flow rates and compositions satisfy the matrix equation, $$Cm=m_T c_T.$$

23. A system according to claim 22, wherein the relative flow rates from each source is $$w=[w_1, \ldots, w_k]^T \text{ in which } w_i=m_i/m_T \; i=1, \ldots, k \text{ and } Cw=c_T,$$

and where each of the individual flow rates $m_1 \ldots m_k$ is calculated based on the definition of $w_i$.

24. A system according to claim 23, wherein in the calculating step solves the above described system of equations.

25. A system according to claim 19, wherein the oil and/or gas production system is an offshore oil and/or gas production system, the pipeline is a riser, the device used in the analyzing step is located topside and the sources are located sub sea.

26. A system according to claim 25, wherein the analyzing device (7) is any from the list of a gas chromatograph, a device using near infrared technology, a mass spectrometer or a device using UV-fluorescence.

27. A system according to claim 26, wherein in the case of that the measurements from the measuring device results in missing values, the computing device calculates the relative flow from each source instead of the absolute flow.

28. A method to allocate a flow back to a plurality of sources of (22a, 23a, 24a) in an oil and/or gas production system (1), said method comprising using a system according to any of claims 17–27 for allocating the flow (22b, 23b, 24b) to the plurality of source (23a, 24a, 25a) in the oil and/or gas production system (1).

* * * * *